(12) United States Patent
Huang et al.

(10) Patent No.: US 8,538,423 B2
(45) Date of Patent: Sep. 17, 2013

(54) METHOD AND APPARATUS FOR SETTING DISCONTINUOUS COMMUNICATION INTERVAL

(75) Inventors: Leping Huang, Tokyo (JP); Lars Dalsgaard, Oulu (FI)

(73) Assignee: Nokia Corporation, Espoo (FI)

( * ) Notice: Subject to any disclaimer, the term of this patent is extended or adjusted under 35 U.S.C. 154(b) by 681 days.

(21) Appl. No.: 12/532,167

(22) PCT Filed: Mar. 19, 2008

(86) PCT No.: PCT/IB2008/000658
§ 371 (c)(1),
(2), (4) Date: Sep. 20, 2009

(87) PCT Pub. No.: WO2008/114130
PCT Pub. Date: Sep. 25, 2008

(65) Prior Publication Data
US 2010/0113023 A1 May 6, 2010

Related U.S. Application Data

(60) Provisional application No. 60/895,614, filed on Mar. 19, 2007.

(51) Int. Cl.
*H04W 88/02* (2009.01)
(52) U.S. Cl.
USPC .......................................................... 455/434
(58) Field of Classification Search
USPC .................. 455/434, 436, 446, 517; 370/311, 370/252, 329
See application file for complete search history.

(56) References Cited

FOREIGN PATENT DOCUMENTS

EP    1569492 A    8/2005
WO    9429981 A    12/1994

OTHER PUBLICATIONS

Nokia: R4-061220,"UE reference signal measurements with DRX",3GPP TSG-RAN WG4 Meeting #41, Riga, Latvia, Nov. 6-10, 2006.
Huawei: R2-060879, "Discussion on Mobility, Hierarchical Cell Structure for LTE Agenda", 3GPP TSG-RAN WG2 Tdoc, Mar. 27-31, 2006 Athens, Greece.
Panasonic, R2-060888, "Contribution DRX and DTX Operation in LTE_Active", 3GPP TSG-RAN WG2 Meeting #52 Athena, Greece, Mar. 27-31, 2006.
Office action received from European Patent Application No. 08719342.1, dated Mar. 22, 2010, 4 pages.
Office Action received from European patent Application No. 08719342.1, dated Sep. 23, 2010, 5 pages.
International Search Report and Written Opinion of the International Searching Authority for PCT Application No. PCT/IB2008/000658, dated Sep. 11, 2008, 14 pages.
Qualcomm, R2-61200, "Paging for LTE Internet Citation", 3GPP TSG-RAN WG2 Meeting #53, May 8, 2006.
Ericsson, R2-070043, "Handover Procedure for DRX Operation in LTE_Active" 3GPP TSG-RAN WG2 Meeting #56bis, Jan. 19, 2007.
3GPP TR 25.813 V7.0.0 (Jun. 2006), Technical Report, $3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Radio Interface Protocol Aspects (Release 7), (39 Pages).

*Primary Examiner* — Diane Mizrahi
(74) *Attorney, Agent, or Firm* — Harrington & Smith

(57) ABSTRACT

An approach is provided for assigning a discontinuous communication interval to a user equipment that is served by a cell associated with a wireless network. The discontinuous communication interval is modified based on speed of the user equipment and size of the cell.

20 Claims, 15 Drawing Sheets

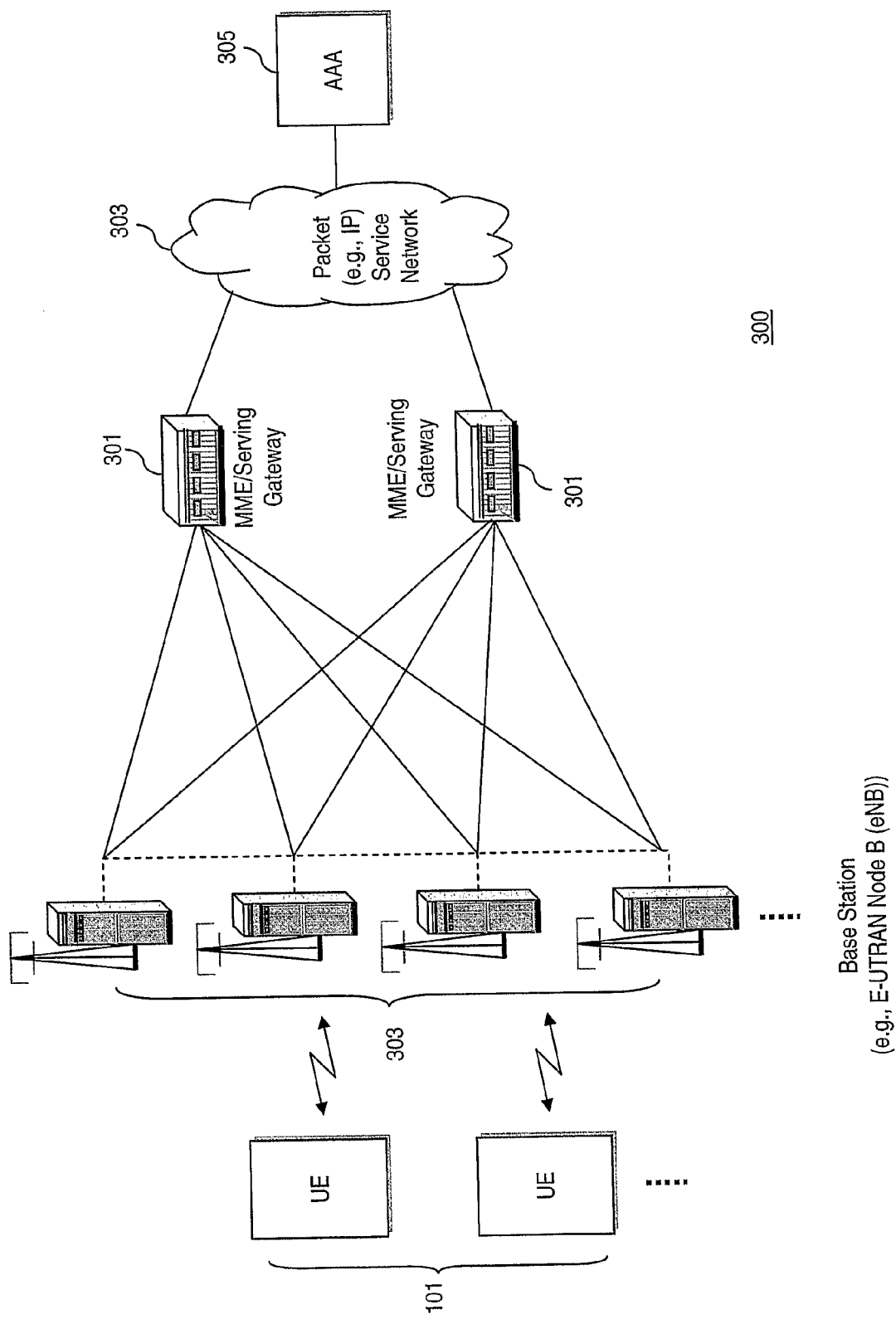

METHOD AND APPARATUS FOR SETTING DISCONTINUOUS COMMUNICATION INTERVAL

RELATED APPLICATION

This application was originally filed as PCT Application No. PCT/IB2008/000658 on Mar. 19, 2008 and claims priority to U.S. Provisional Application No. 60/895,614 filed on Mar. 19, 2007, which is incorporated herein by reference in its entirety.

BACKGROUND

Radio communication systems, such as a wireless data networks (e.g., Third Generation Partnership Project (3GPP) Long Term Evolution (LTE) systems, spread spectrum systems (such as Code Division Multiple Access (CDMA) networks), Time Division Multiple Access (TDMA) networks, etc.), provide users with the convenience of mobility along with a rich set of services and features. This convenience has spawned significant adoption by an ever growing number of consumers as an accepted mode of communication for business and personal uses. To promote greater adoption, the telecommunication industry, from manufacturers to service providers, has agreed at great expense and effort to develop standards for communication protocols that underlie the various services and features. One area of effort involves optimizing transmission of data in a manner that accounts for conservation of power of the terminal and end user performance.

SOME EXEMPLARY EMBODIMENTS

Therefore, there is a need for an approach for providing efficient signaling for network planning, which can co-exist with already developed standards and protocols.

According to one embodiment of the invention, a method comprises assigning a discontinuous communication interval to a user equipment that is served by a cell associated with a wireless network. The method also comprises modifying the discontinuous communication interval based on speed of the user equipment and size of the cell.

According to another embodiment of the invention, an apparatus comprises a transmission management module configured to assign a discontinuous communication interval to a user equipment that is served by a cell associated with a wireless network, and to modify the discontinuous communication interval based on speed of the user equipment and size of the cell.

According to another embodiment of the invention, a method comprises collecting radio channel information and speed information associated with a cell of a wireless network. The method also comprises initiating a discontinuous communication procedure to modify a discontinuous reception interval based on either the radio channel information, a ratio of the speed information and size of the cell, or a combination thereof.

According to yet another embodiment of the invention, an apparatus comprises a transmission management module configured to collect radio channel information and speed information associated with a cell of a wireless network, and to initiate a discontinuous communication procedure to modify a discontinuous reception interval based on either the radio channel information, a ratio of the speed information and size of the cell, or a combination thereof.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 3A-3D are diagrams of communication systems having exemplary long-term evolution (LTE) and E-UTRA (Evolved Universal Terrestrial Radio Access) architectures, in which the user equipment (UE) and the base station of FIG. 2 can operate, according to various exemplary embodiments of the invention;

DESCRIPTION OF PREFERRED EMBODIMENTS

An apparatus, method, and software for setting a discontinuous communication interval are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although the embodiments of the invention are discussed with respect to a communication network having a UMTS (Universal Mobile Telecommunication System) Terrestrial Radio Access Network (UTRAN) Long-Term Evolution architecture, it is recognized by one of ordinary skill in the art that the embodiments of the inventions have applicability to any type of communication system and equivalent functional capabilities.

Figure 1:
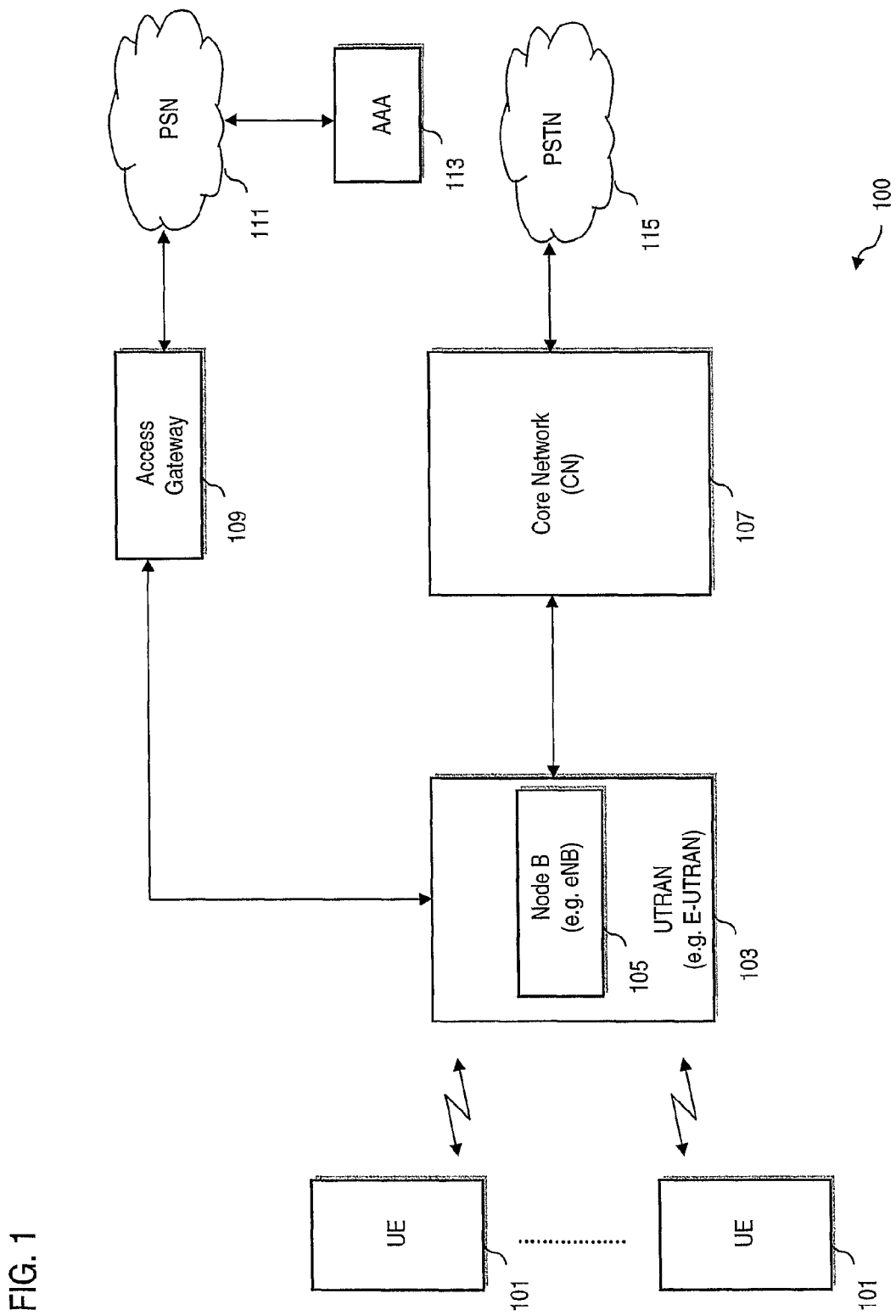
FIG. 1 is a diagram showing a communication system capable of providing discontinuous communication, according to an exemplary embodiment of the invention.

FIG. 1 is a diagram of a communication system 100 capable of providing discontinuous communication, according to an exemplary embodiment of the invention. By way of example, communication system 100 utilizes an architecture compliant with the UMTS terrestrial radio access network (UTRAN) or Evolved UTRAN (E-UTRAN) in 3GPP. As shown, one or more user equipment (UE) 101 communicates with UTRAN 103 that includes one or more base stations 105, which under the 3GPP LTE architecture is specifically denoted as an enhanced Node B (eNB). These base stations 105 communicate with the UEs 101 and provide service to one or more cells in a cellular architecture. The UTRAN 103 provides the air interface access method for the UEs 101, where the UEs 101 can be any type of mobile station, such as handsets, terminals, stations, units, devices, or any type of interface to the user (such as "wearable" circuitry, etc.). The UE 101 includes a transceiver and an antenna system (not shown) that couples to the transceiver to receive or transmit signals from the base station 105; the antenna system can include one or more antennas.

As with the UE 101, the base station 105 employs a transceiver (not shown), which transmits information to the UE 101. Also, the base station 105 can employ one or more antennas for transmitting and receiving electromagnetic signals. For instance, the Node B 105 may utilize a Multiple Input Multiple Output (MIMO) antenna system, whereby the Node B 105 can support multiple antenna transmit and receive capabilities. This arrangement can support the parallel transmission of independent data streams to achieve high data rates between the UEs 101 and Node Bs 105.

The Node B 105 and the UE 101 can communicate using Wideband Code Division Multiple Access (WCDMA), Orthogonal Frequency Division Multiplexing (OFDM) or Single Carrier Frequency Division Multiple Access (FDMA) (SC-FDMA). In an exemplary embodiment, both the uplink (from the UE 101 to the network) and the downlink (from the network to the UE 101) can utilize WCDMA.

As shown in FIG. 1, the system 100 also includes a core network (CN) 107 that handles communication sessions between the UEs 101 and Node Bs 105, and can provide such functions as switching, routing and transit for user traffic. The CN 107 can interface with a Public Switched Telephone Network (PSTN) 115 for supporting the exchange of telephone calls between mobile users serviced by the core network 107 and users on various other alternative telephony systems.

One or more Access Gateways (AGWs) 109 are also connected to the Node B 105 in a full or partial mesh configuration using tunneling over a packet transport network (e.g., IP network). Exemplary functions of the AGW 109 include distribution of paging messages to Node Bs, Internet Protocol (IP) header compression and encryption of user data streams, termination of U-plane packets for paging reasons, and switching of U-plane for support of UE mobility. The AGW 109 is furthermore connected to a packet service network (PSN) 111, which may be a public data network (e.g., the Internet) or a private consumer network. The AGWs 109 communicate with an Access, Authorization and Accounting system (AAA) 113 to securely determine the identity and privileges of users as well as track the users' activities.

The system 100 provides an efficient network planning scheme that can be performed at the user equipment side, such as at UE 101, or the enhanced Node B 105 at the network side using a discontinuous reception and/or transmission (DRX/DTX) management module integrated within the UE 101 or Node B 105. The planning scheme specifically enables the UE 101 to save power through discontinuous transmission and reception.

Figure 2:
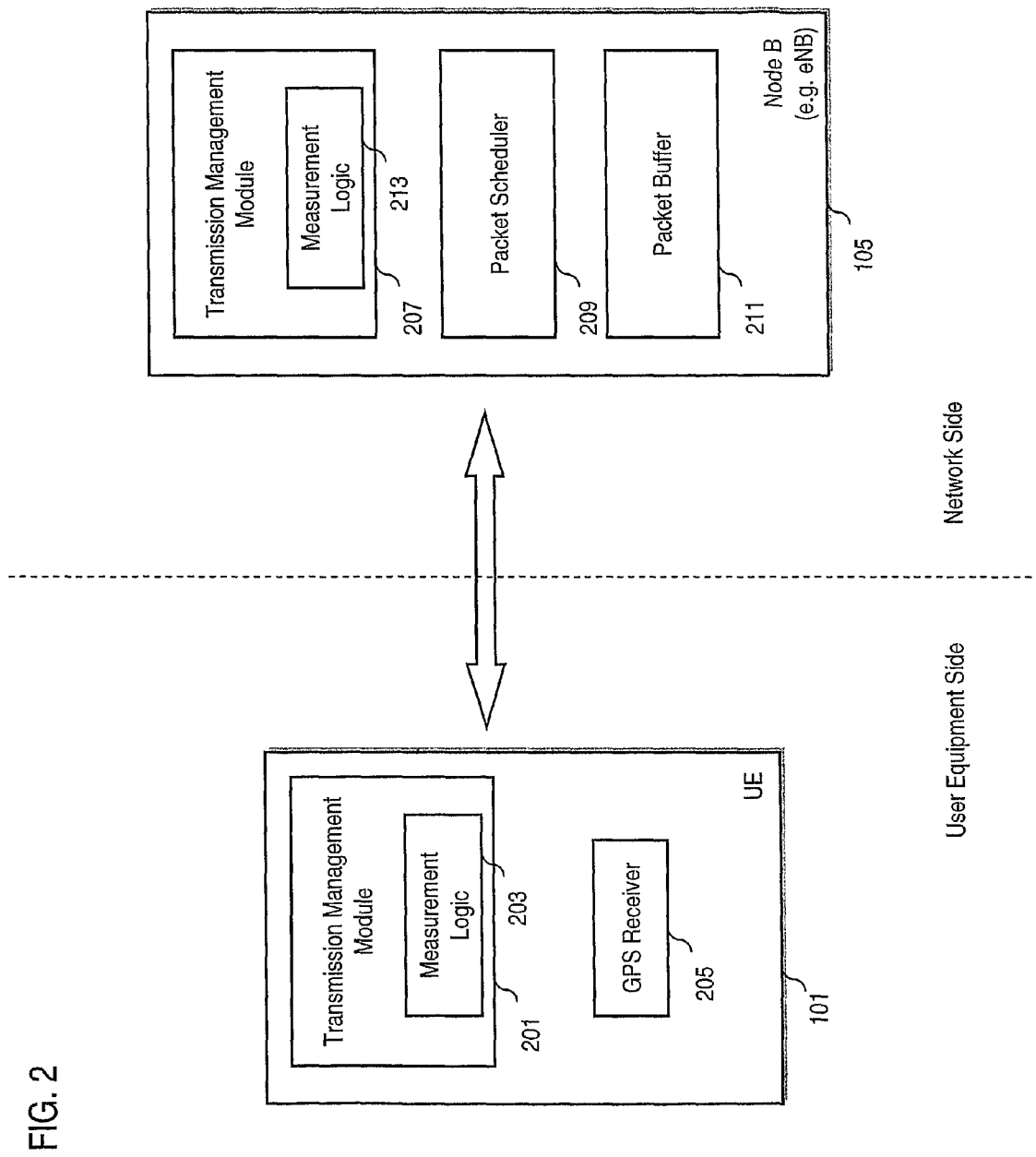
FIG. 2 is a diagram showing components of the user equipment (UE) and the base station of the system of FIG. 1, according to an exemplary embodiment of the invention.

FIG. 2 is a diagram showing components of the user equipment (UE) and the base station of the system of FIG. 1, according to an exemplary embodiment of the invention. In one embodiment, the system 100, as an LTE network, is a packet-based system; thus, there is no so-called "dedicated" connection (as known from 2G and 3G) reserved for communication between the UE 101 and the network (i.e., the base station 105). In an exemplary embodiment, resources needed for data transfer in the LTE architecture are assigned either as one time assignments or in a more persistent/semi-static way.

It is noted that over time there can be large variations in the traffic scheduled to a particular UE 101 (i.e., user or subscriber). From a multi-user diversity perspective, it may be so that the UE 101 (which can be an enhanced UE (eUE)) is seldomly scheduled (e.g., every 20 ms in average for instance), but with a very high instantaneous data rate (since the eUE is scheduled when the UEs radio conditions are excellent). From the eUE perspective, it is important that if such scheduling patterns can be predicted, the "off-periods" can be utilized to initiate entry into an inactive or "sleep" state, thereby saving battery consumption. The agreement of "on" and "off/DRX" periods needs be clear between the eNB 105 and the eUE 101, and is assumed to be signaled through a higher layer robust (e.g. acknowledged with hand-shake) signaling channel (e.g., RRC (Radio Resource Control) signaling is the default mechanism in LTE).

The UE 101 includes a discontinuous communication (e.g., reception/transmission (RX/TX)) management module 201 for managing active and inactive states of reception and transmission with the base station 105. Thus, this discontinuous RX/TX mechanism, as mentioned above, conserves battery consumption during non-transmission or non-reception periods. The transmission management module 201 can include measurement logic 203 for determining radio channel quality information as well as information regarding the speed of the UE 101. In an exemplary embodiment, the UE 101 utilizes a Global Positioning System (GPS) receiver 205 to determine positioning information, which can be used to compute absolute speed of the UE 101.

Further, the discontinuous communication management module 201 can instruct the UE 101 to remain in an active state ("awake") or enter an inactive state ("sleep") based on, for example, signaling from the base station 105.

As shown, the base station 105 can include a discontinuous communication management module 207 for managing active and inactive states of reception and transmission. The management module 207 interacts with a packet scheduler 209 to coordinate exchange of data between the base station 105 and the UE 101; the data to be transmitted to the UE 101 can be stored in a packet buffer 211. In one embodiment, the base station 105 has a measurement logic module 213 that is configured to determine various transmission factors, including radio channel quality, power, and UE speed, etc.

To better appreciate the operation of the transmission management modules 203, 207, a "regular DRX" mechanism is described. This mechanism is characterized by three parameters: (1) the exact "phase/timing" of the starting point of the first "on" period, (2) the DRX period (or interval) denoting the "time distance" between consecutive "on" periods, and (3) the duration of each on-period. To achieve substantial eUE power saving, the DRX period should be as long as possible. However, as the DRX period also defines the "responsiveness" of the system 100 (e.g., length of time from when the UE 101 clicks on a web-link until the web-page starts downloading), a compromise is needed between the level of power savings and responsiveness.

FIGS. 3A-3D are diagrams of communication systems having exemplary long-term evolution (LTE) architectures, in which the user equipment (UE) and the base station of FIG. 2 can operate, according to various exemplary embodiments of the invention. By way of example (shown in FIG. 3A), a base station (e.g., destination node 103) and a user equipment (UE) (e.g., source node 101) can communicate in system 300 using any access scheme, such as Time Division Multiple Access (TDMA), Code Division Multiple Access (CDMA), Wideband Code Division Multiple Access (WCDMA), Orthogonal Frequency Division Multiple Access (OFDMA) or Single Carrier Frequency Division Multiple Access (FDMA) (SC-FDMA) or a combination of thereof. In an exemplary embodiment, both uplink and downlink can utilize WCDMA. In another exemplary embodiment, uplink utilizes SC-FDMA, while downlink utilizes OFDMA.

The communication system 300 is compliant with 3GPP LTE, entitled "Long Term Evolution of the 3GPP Radio Technology" (which is incorporated herein by reference in its entirety). As shown in FIG. 3A, one or more user equipment (UEs) 101 communicate with a network equipment, such as a base station 105, which is part of an access network (e.g., WiMAX (Worldwide Interoperability for Microwave Access), 3GPP LTE (or E-UTRAN or 3.9G), etc.). Under the 3GPP LTE architecture, base station 105 is denoted as an enhanced Node B (eNB).

MME (Mobile Management Entity)/Serving Gateways 301 are connected to the eNBs 105 in a full or partial mesh configuration using tunneling over a packet transport network (e.g., Internet Protocol (IP) network) 303. Exemplary functions of the MME/Serving GW 301 include distribution of paging messages to the eNBs 105, termination of U-plane packets for paging reasons, and switching of U-plane for support of UE mobility. Since the GWs 301 serve as a gateway to external networks, e.g., the Internet or private networks 303, the GWs 301 include an Access, Authorization and Accounting system (AAA) 305 to securely determine the identity and privileges of a user and to track each user's activities. Namely, the MME Serving Gateway 301 is the key control-node for the LTE access-network and is responsible for idle mode UE tracking and paging procedure including retransmissions. Also, the MME 301 is involved in the bearer activation/deactivation process and is responsible for selecting the SGW (Serving Gateway) for a UE at the initial attach and at time of intra-LTE handover involving Core Network (CN) node relocation.

A more detailed description of the LTE interface is provided in 3GPP TR 25.813, entitled "E-UTRA and E-UTRAN: Radio Interface Protocol Aspects," which is incorporated herein by reference in its entirety.

Figure 3B:
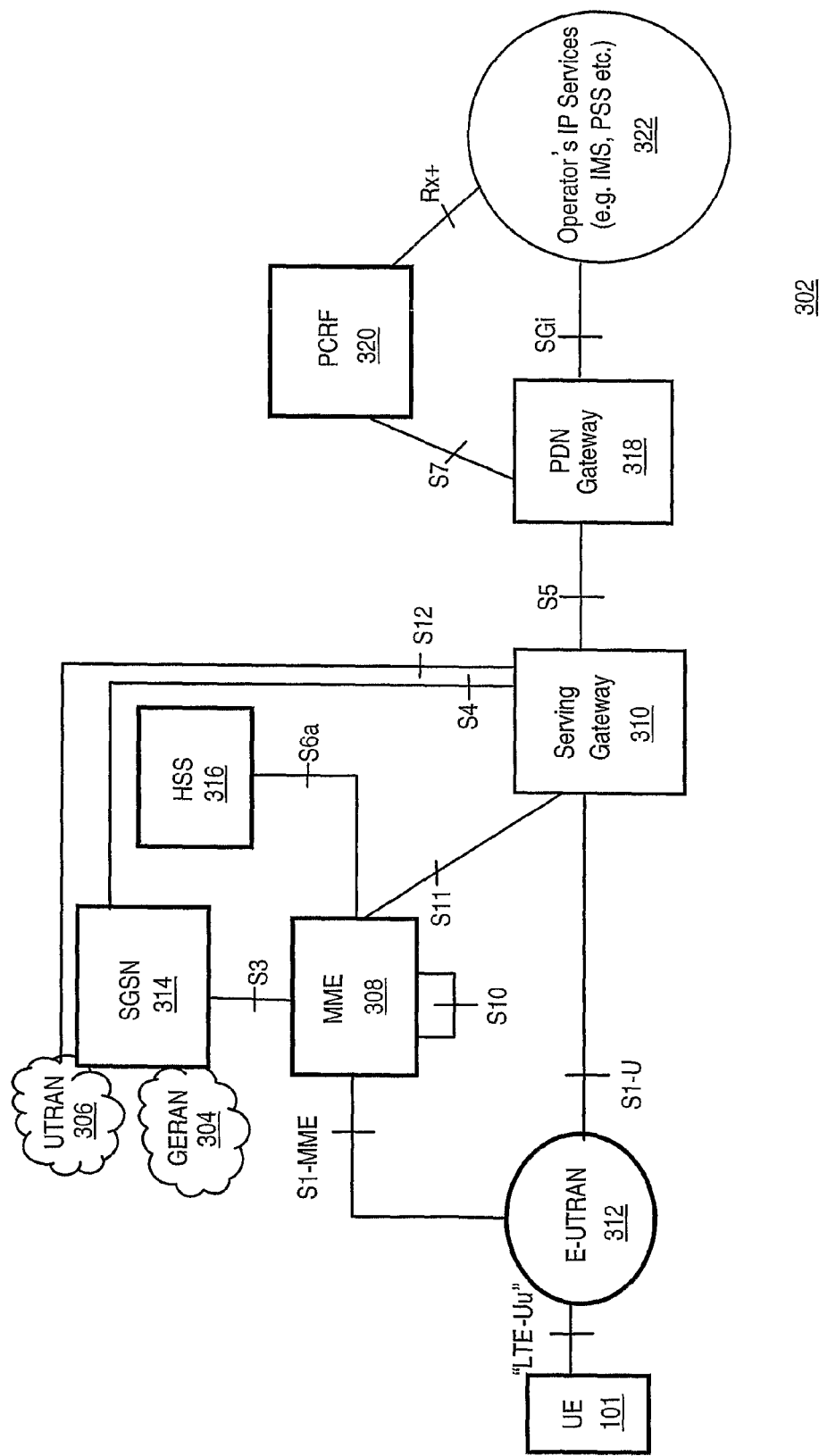

In FIG. 3B, a communication system 302 supports GERAN (GSM/EDGE radio access) 304, and UTRAN 306 based access networks, E-UTRAN 312 and non-3GPP (not shown) based access networks, and is more fully described in TR 23.882, which is incorporated herein by reference in its entirety. A key feature of this system is the separation of the network entity that performs control-plane functionality (MME 308) from the network entity that performs bearer-plane functionality (Serving Gateway 310) with a well defined open interface between them S11. Since E-UTRAN 312 provides higher bandwidths to enable new services as well as to improve existing ones, separation of MME 308 from Serving Gateway 310 implies that Serving Gateway 310 can be based on a platform optimized for signaling transactions. This scheme enables selection of more cost-effective platforms for, as well as independent scaling of, each of these two elements. Service providers can also select optimized topological locations of Serving Gateways 310 within the network independent of the locations of MMEs 308 in order to reduce optimized bandwidth latencies and avoid concentrated points of failure.

As seen in FIG. 3B, the E-UTRAN (e.g., eNB) 312 interfaces with UE 101 via LTE-Uu. The E-UTRAN 312 supports LTE air interface and includes functions for radio resource control (RRC) functionality corresponding to the control plane MME 308. The E-UTRAN 312 also performs a variety of functions including radio resource management, admission control, scheduling, enforcement of negotiated uplink (UL) QoS (Quality of Service), cell information broadcast, ciphering/deciphering of user, compression/decompression of downlink and uplink user plane packet headers and Packet Data Convergence Protocol (PDCP).

The MME 308, as a key control node, is responsible for managing mobility UE identifies and security parameters and paging procedure including retransmissions. The MME 308 is involved in the bearer activation/deactivation process and is also responsible for choosing Serving Gateway 310 for the UE 101. MME 308 functions include Non Access Stratum (NAS) signaling and related security. MME 308 checks the authorization of the UE 101 to camp on the service provider's Public Land Mobile Network (PLMN) and enforces UE 101 roaming restrictions. The MME 308 also provides the control plane function for mobility between LTE and 2G/3G access networks with the S3 interface terminating at the MME 308 from the SGSN (Serving GPRS Support Node) 314.

The SGSN 314 is responsible for the delivery of data packets from and to the mobile stations within its geographical service area. Its tasks include packet routing and transfer, mobility management, logical link management, and authentication and charging functions. The S6a interface enables transfer of subscription and authentication data for authenticating/authorizing user access to the evolved system (AAA interface) between MME 308 and HSS (Home Subscriber Server) 316. The S10 interface between MMEs 308 provides MME relocation and MME 308 to MME 308 information transfer. The Serving Gateway 310 is the node that terminates the interface towards the E-UTRAN 312 via S1-U.

The S1-U interface provides a per bearer user plane tunneling between the E-UTRAN 312 and Serving Gateway 310. It contains support for path switching during handover between eNBs 105. The S4 interface provides the user plane with related control and mobility support between SGSN 314 and the 3GPP Anchor function of Serving Gateway 310.

The S12 is an interface between UTRAN 306 and Serving Gateway 310. Packet Data Network (PDN) Gateway 318 provides connectivity to the UE 101 to external packet data networks by being the point of exit and entry of traffic for the UE 101. The PDN Gateway 318 performs policy enforcement, packet filtering for each user, charging support, lawful interception and packet screening. Another role of the PDN Gateway 318 is to act as the anchor for mobility between 3GPP and non-3GPP technologies such as WiMax and 3GPP2 (CDMA 1X and EvDO (Evolution Data Only)).

The S7 interface provides transfer of QoS policy and charging rules from PCRF (Policy and Charging Role Function) 320 to Policy and Charging Enforcement Function (PCEF) in the PDN Gateway 318. The SGi interface is the interface between the PDN Gateway and the operator's IP services including packet data network 322. Packet data network 322 may be an operator external public or private packet data network or an intra operator packet data network, e.g., for provision of IMS (IP Multimedia Subsystem) services. Rx+ is the interface between the PCRF and the packet data network 322.

Figure 3C:
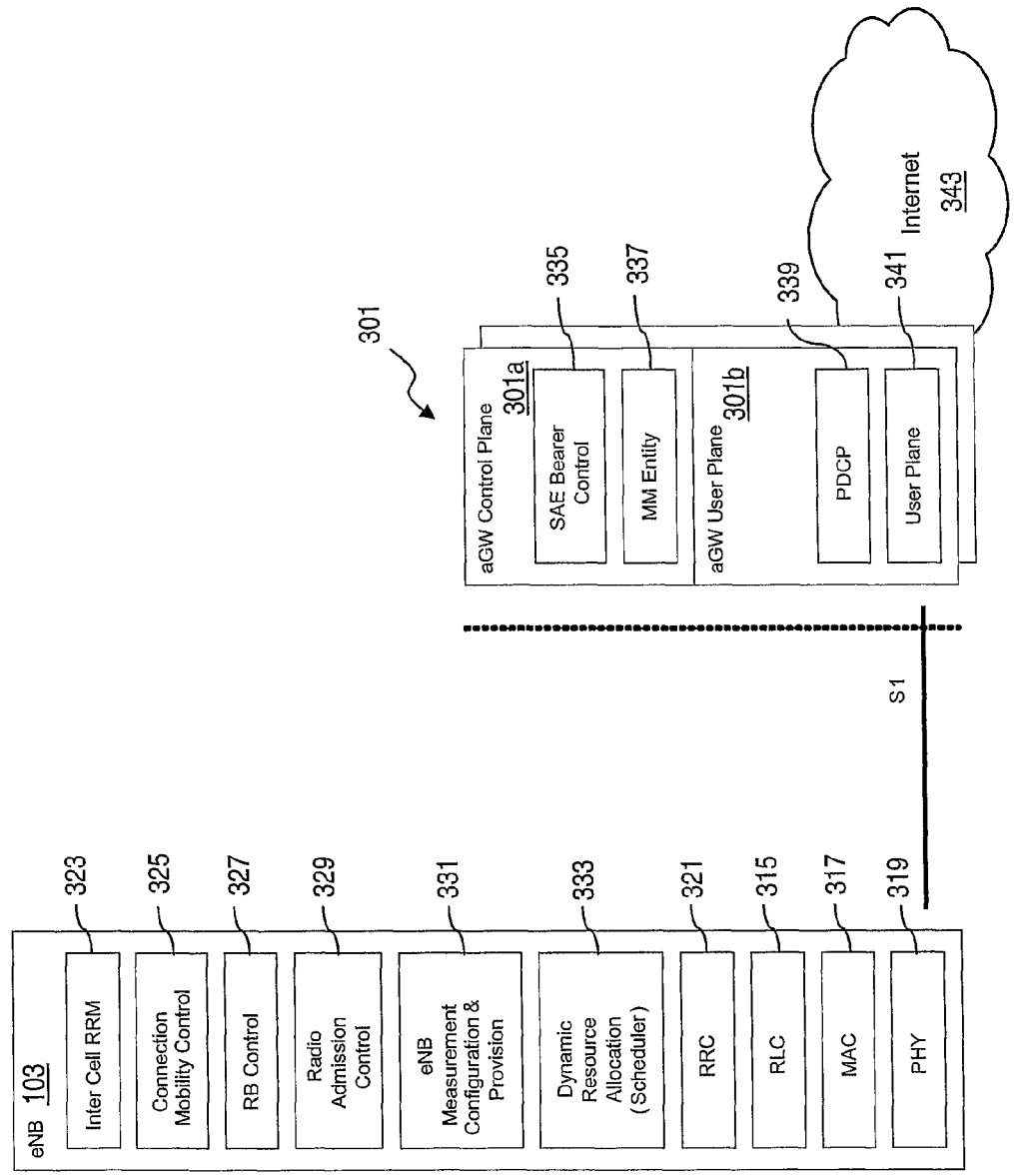

As seen in FIG. 3C, the eNB 105 utilizes an E-UTRA (Evolved Universal Terrestrial Radio Access) (user plane, e.g., RLC (Radio Link Control) 315, MAC (Media Access Control) 317, and PHY (Physical) 319, as well as a control plane (e.g., RRC 321)). The eNB 105 also includes the following functions: Inter Cell RRM (Radio Resource Management) 323, Connection Mobility Control 325, RB (Radio Bearer) Control 327, Radio Admission Control 329, eNB Measurement Configuration and Provision 331, and Dynamic Resource Allocation (Scheduler) 333.

The eNB 105 communicates with the aGW 301 (Access Gateway) via an S1 interface. The aGW 301 includes a User Plane 301*a* and a Control plane 301*b*. The control plane 301*b* provides the following components: SAE (System Architecture Evolution) Bearer Control 335 and MM (Mobile Management) Entity 337. The user plane 301*b* includes a PDCP (Packet Data Convergence Protocol) 339 and a user plane functions 341. It is noted that the functionality of the aGW 301 can also be provided by a combination of a serving gateway (SGW) and a packet data network (PDN) GW. The aGW 301 can also interface with a packet network, such as the Internet 343.

Figure 3D:
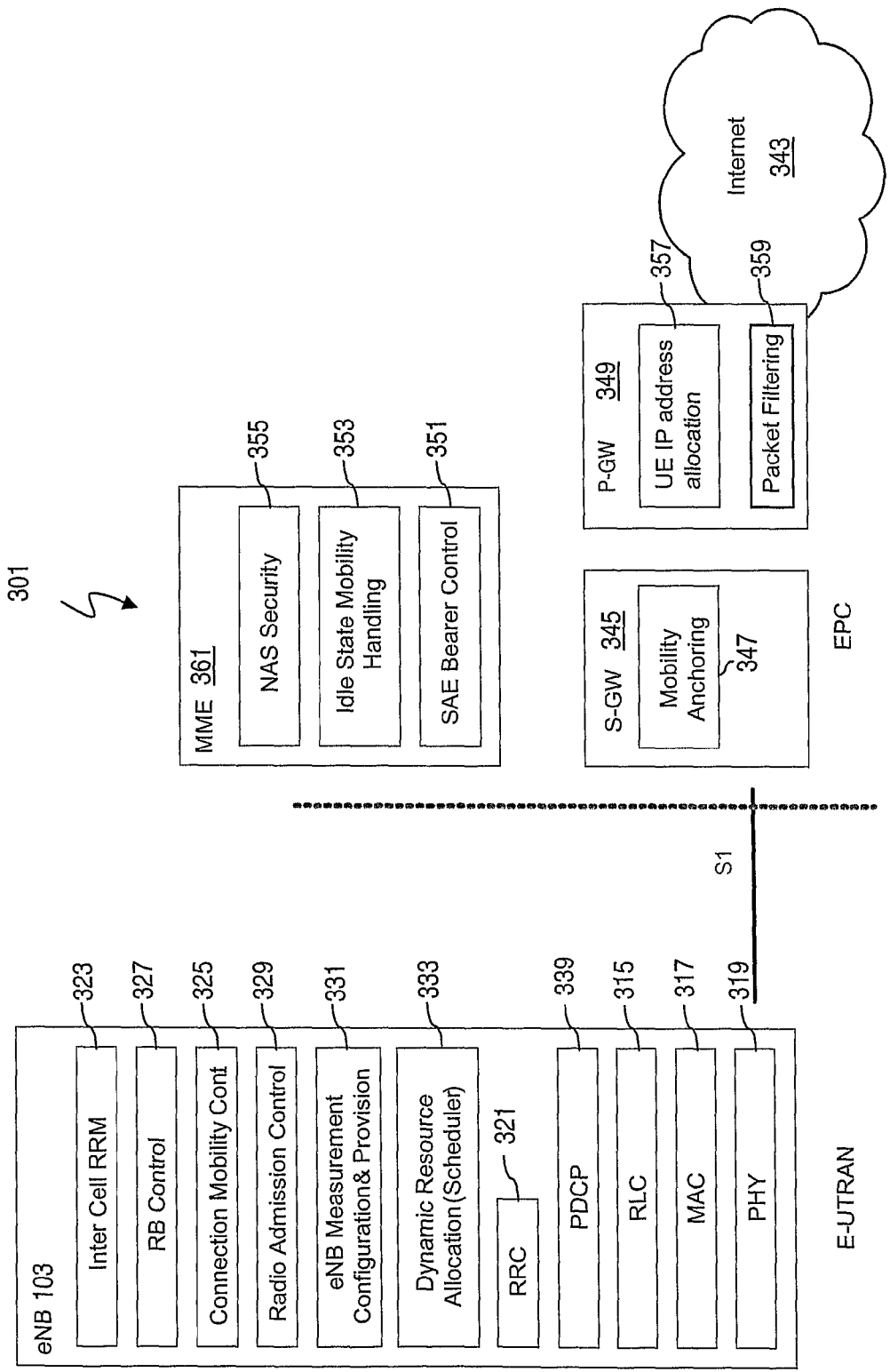

In an alternative embodiment, as shown in FIG. 3D, the PDCP (Packet Data Convergence Protocol) functionality can reside in the eNB 105 rather than the GW 301. Other than this PDCP capability, the eNB functions of FIG. 3C are also provided in this architecture.

In the system of FIG. 3D, a functional split between E-UTRAN and EPC (Evolved Packet Core) is provided. In this example, radio protocol architecture of E-UTRAN is provided for the user plane and the control plane. A more detailed description of the architecture is provided in 3GPP TS 36.300.

The eNB 105 interfaces via the S1 to the Serving Gateway 345, which includes a Mobility Anchoring function 347. According to this architecture, the MME (Mobility Management Entity) 349 provides SAE (System Architecture Evolution) Bearer Control 351, Idle State Mobility Handling 353, and NAS (Non-Access Stratum) Security 355.

Figure 4A:
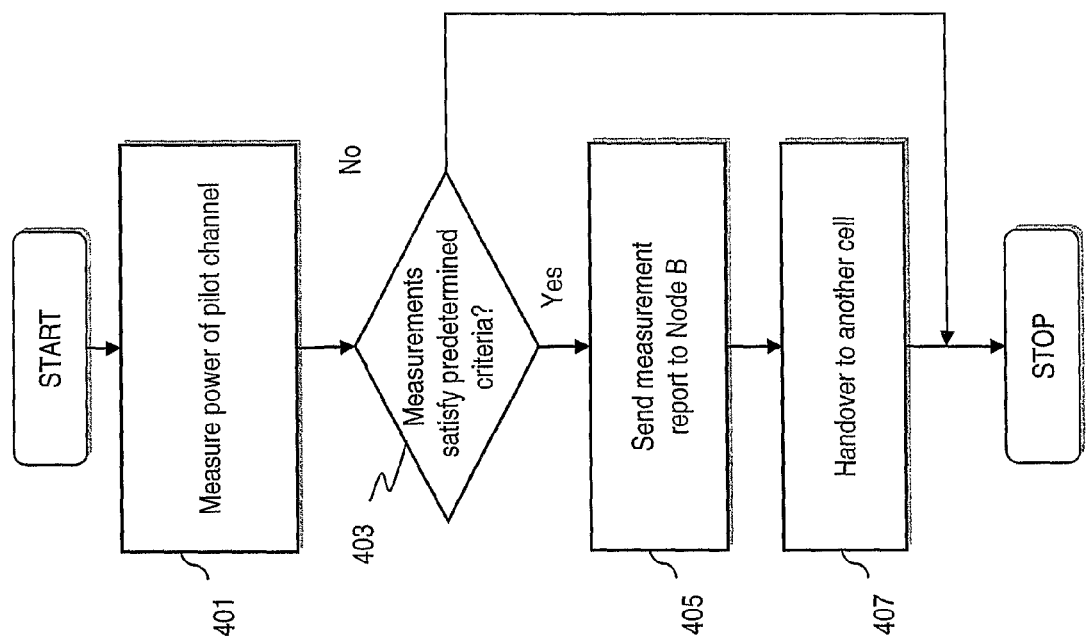
FIGS. 4A and 4B are flowcharts of processes for generating measurement reports and for detecting radio link failure, respectively, in accordance with various embodiments of the invention.
Figure 4B:
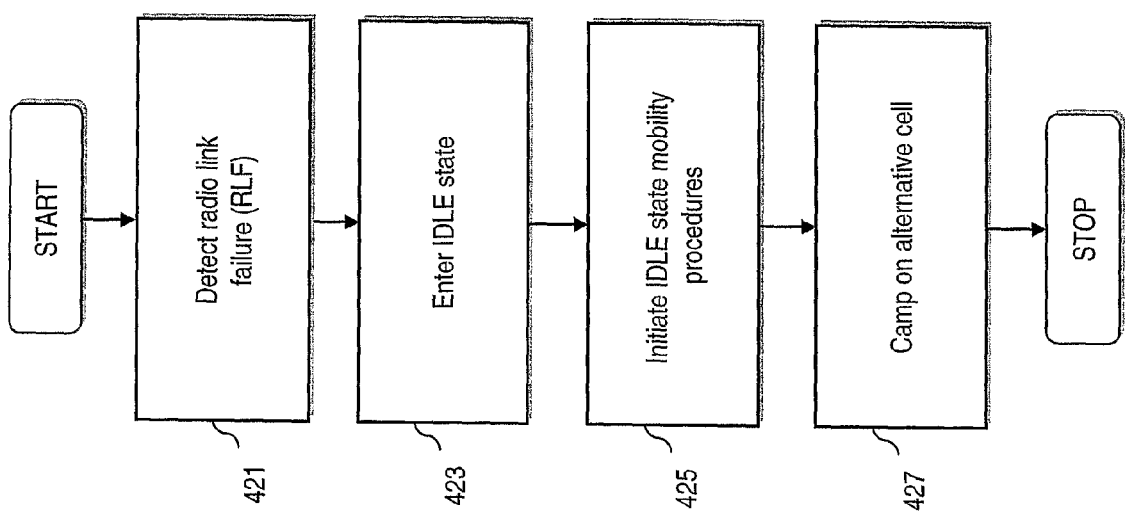

FIGS. 4A and 4B are flowcharts of processes for generating measurement reports and for detecting radio link failure, respectively, in accordance with various embodiments of the invention. For supporting mobility, the UE 101 can periodically measure the power of a pilot channel (also referred to as reference signal) of different cells, as in step 401. If the measurement results between current serving cell and neighboring cell satisfy predetermined criteria (as in step 403), the UE 101 can send a measurement report to Node B 105, per step 405. Thereafter, the UE 101 can perform a handover procedure to communicate using another cell (step 407).

In some situations, the measurement reporting and handover procedures cannot react quickly enough to the change transmission environment, resulting in radio link failure (RLF). RLF is caused by various reasons, such as sudden change of radio channels and improper configuration of handover (HO) parameters. FIG. 4B shows how such failure can trigger a handover to another cell.

As shown, in step 421, the UE 101 detects a RLF, resulting in the UE 101 entering an idle state (step 423). Consequently, idle state mobility procedures (cell selection or reselection) are initiated to find a suitable cell to camp on, per steps 425 and 427.

Figure 5:
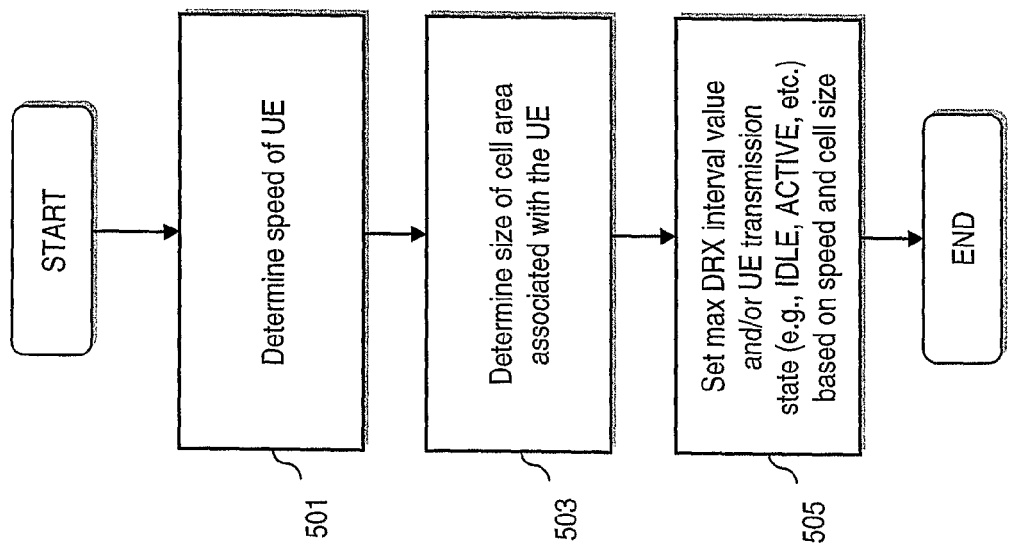
FIG. 5 is a flowchart of a process for setting a discontinuous communication interval, in accordance with various embodiments of the invention.

FIG. 5 is a flowchart of a process for setting a discontinuous communication interval, in accordance with various embodiments of the invention. Upon examining (using various simulations) the performance of DRX when accounting for speed of the UE 101, the following observations are noted. In the case when the UE speed is high and/or cell size is small, long DRX periods/intervals tend to result in high probability of RLF and smaller cell coverage (lower SNR (Signal-to-Noise Ratio). Conversely, when the UE speed is low and/or cell size is large, a long DRX period does not result in frequent RLF; and thus, there is no serious degradation regarding cell coverage.

It is recognized that a special relationship exists between the maximum possible DRX interval, the UE speed, and cell size. In particular, to limit or minimize the probability for radio link failure, the maximum DRX interval exhibits the following relationship:

$$\text{Maximum } DRX \text{ interval} = f(UE \text{ speed, cell size}). \quad \text{Eq. (1)}$$

Therefore, when the UE speed is high and/or cell size is small, it may be desirable to have the UE 101 enter into an idle state, rather than apply a long DRX (e.g., in RRC_CONNECTED mode), and to use the idle state DRX (paging) procedure. With this approach, the UE 101 can avoid the timeout delay related to the detection of the RLF after DRX wakeup as well as the delay due to invocation of the RLF procedure.

Under the scenario in which the UE speed is low and/or cell size is large, the relationship derived above, Eq. (1), suggests that it is desirable to keep the UE 101 in the active state continuously—thereby, fully utilizing the possibility of having a long DRX in active mode. By using the long DRX in active mode, the UE 101 can avoid the signaling overhead because of the switch between idle state and active state, while benefiting from the power saving possibilities stemming from having a long DRX.

As shown in FIG. 5, speed of the UE and size of the cell area associated with the UE 101 are determined, as in steps 501 and 503. Next, the maximum DRX interval is set and/or UE transmission state (e.g., idle, active, etc.) based on these parameters of UE speed and cell size, per step 505. The UE 101 may experience poorer performance regarding mobility (in the sense that the number of triggered RLF's will increase) if the UE 101 utilizes a DRX longer than this maximum value.

In an exemplary embodiment, the speed of the UE 101 can be specified (or otherwise derived) from a UE measurement report. The UE measurements can be performed at DRX instances. When the UE 101 is not active due to DRX, no measurements can be performed by the UE 101.

According to one embodiment, the Node B 105 can thus store the maximum DRX interval value per UE; alternatively, the maximum DRX interval values can be associated with the cell level (i.e., per cell). If the UE 101 needs to enter a DRX interval larger than the maximum DRX interval value, the Node B 105 can instruct the UE 101 to transition to the idle mode; otherwise, the Node B 105 can request the UE 101 to use active state DRX.

Figure 6:
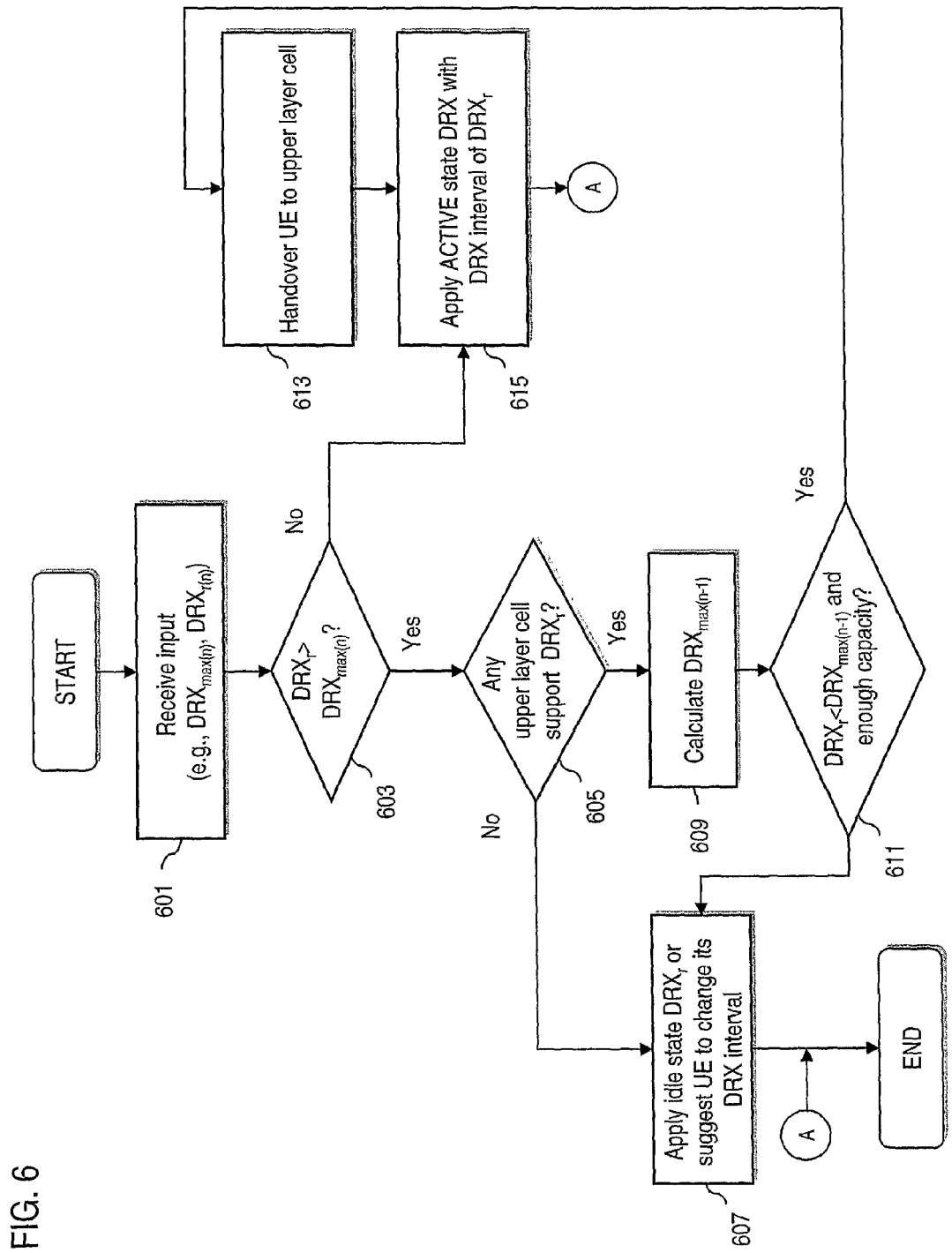
FIG. 6 is a flowchart of a process for determining a discontinuous communication interval in multi-layered cell system, in accordance with various embodiments of the invention.

FIG. 6 is a flowchart of a process for determining a discontinuous communication interval in multi-layered cell system, in accordance with various embodiments of the invention. For the purposes of illustration, the system 100 is described as a radio communication network having a hierarchical cell structure (HCS), as in UMTS. In such a multi-layered cellular network, the subscribers (e.g., UEs 101) are handed over from the macro to the micro to the pico layer depending on the current network capacity and the needs of the subscriber. When UE speed increases, the UE 101 is moved from a lower layer cell (i.e., smaller cell size) to a higher layer cell. This is referred to as an "upward vertical handover." A larger cell typically cannot support many UEs—i.e., has smaller throughput. The approach can reduce throughput of the UE 101 on one hand, but reduces the amount of radio link failures on the other hand. Conversely, when UE speed decreases, the UE 101 is moved from the higher layer to a lower layer; this handover is referred to as "downward vertical handover." Such handover increases throughput.

As discussed above, the maximum DRX interval the UE 101 can use in active state depends on both UE speed and cell size. If the UE 101 uses a DRX longer than the maximum value, the UE 101 may encounter degraded performance, as the number of radio link failures is likely to increase.

The network planning scheme described herein, according to various embodiments, can fully utilize the DRX feature considering both the state transition and hierarchical cell structure. First, a network planning process (or algorithm) is provided to maximize the opportunities of using active state DRX by considering both the cell structure and state transition. This process can be implemented in Node B 105 (i.e., eNB) or other entities on the network side and can be viewed as more or less static. Secondly, the cell and DRX interval found to be optimal for a UE 101 under certain circumstances may become non-optimal in practice because of fast changing UE speed and channel quality, etc. Considering those changing factors, a semi-static algorithm to adjust DRX interval, and/or measurement event, is provided according to certain embodiments.

Thirdly, the network (in one embodiment, using the static or semi-static process) can define and broadcast information rules concerning measurement quantity levels and DRX length. If a set threshold level condition is fulfilled (e.g., measurement quantity goes below a set threshold during a certain DRX length), this triggers a measurement event or measurement reporting event. Alternatively, the UE 101 can autonomously (based on information provided by network) shorten the measurement interval. That is, the UE 101 can initiate on its own the change of the time periods for taking measurements.

Furthermore, where UE speed is not needed and all control is in the network, the eNB 105 provides a maximum limit on the DRX length supported in a certain cell. If the DRX to be configured (by eNB) exceeds this limit, the eNB 105 can instead trigger a handover to a cell supporting the DRX length.

For reference purposes, the process of FIG. 6 defines the following variables: $DRX_{max(n)}$ represents the maximum DRX interval the network can support without degrading handover measurement performance in layer n of HCS, and $DRX_r$ denotes the UE's required DRX interval. In step 601, the following inputs are received:

1) Maximum DRX given certain UE speed and cell size at a layer n cell, where $DRX_{max(n)}$=f(UE speed, cell size of layer n cell); and 2) Required DRX interval for a UE, given a particular Quality of Service (QoS) and traffic profile, where $DRX_{r(n)}$=f(UE's QoS, UE's traffic).

If the DRX interval required by the UE 101 is longer than what a cell in the current layer may support, as determined in step 603, the network will first try to find proper upper level cell with enough capacity that can support this DRX interval in active mode, per step 605. If not, then the active state DRX is applied with DRX interval of $DRX_r$ (step 607).

However, if the network finds a proper cell, the network moves this UE 101 to an upper level cell (i.e., upward vertical handover). Specifically, the $DRX_{r(n-1)}$ for the next upper cell is determined, as in step 609. In step 611, the determined interval, $DRX_{r(n-1)}$, is compared with $DRX_r$; if $DRX_{r(n-1)}$, is less than $DRX_r$, and there is sufficient capacity, then the UE 101 undergoes a handover procedure to utilize this new cell (step 613). In step 615, the process applies active state DRX with DRX interval of $DRX_r$.

One exemplary embodiment is to use a metric that represents a ratio of UE speed versus cell size:

$$X = UE \text{ speed/cell size}. \qquad \text{Eq. (2)}$$

When this value is small, the ratio indicates that the UE 101 basically does not move relative to the cell. Consequently, the UE 101 can use a long DRX interval. On the other hand, when this value is large, this indicates that the UE 101 moves relatively fast inside the cell; as a result, some action needs to be taken to avoid radio link failures—e.g., the UE 101 can be moved to a higher level cell, as explained in the above process.

As made apparent, because of the change of UE speed, a static algorithm for determining the DRX interval is not likely to be useful after the initial setting. As a result, semi-static DRX algorithms are utilized to adjust the DRX parameters. With respect to the semi-static DRX adjustment algorithm, this scheme, according to certain embodiments, collects two types of metrics: UE speed, and radio channel quality measurements. It is contemplated that various methods can be used to determine the UE speed. One approach can be based on the number of handovers, which may provide an indicator on the relative speed to the current cell. Another technique involves utilizing the absolute speed from, for example, a Global Positioning System (GPS) source.

Further, radio channel quality can be acquired by a variety of approaches. For instance, the number of radio link failures can be used to reflect the radio channel quality. Another approach examines the number of instances where the UE's channel quality (e.g., pilot SNR) falls below a predetermined threshold (e.g., −5 dB). Also, it is noted that the degradation of channel quality can stem from the fact that UE 101 does not execute/conduct sufficient measurements for the handovers; such observation can thus be indicative of radio channel quality.

According to an exemplary embodiment, events can be set for both or either of these two metrics. If both (or either) of the events are triggered, the UE/eNB can trigger semi-static DRX change procedures to adjust its current DRX interval. For example, Table 1 lists various speed metrics and their corresponding radio metrics where the Preferred Service Specific Information (PSSI) thresholds are 5 dB and 3 dB corresponding to sliding windows of 500 ms and 200 ms, respectively. In view of the current HO measurement approach, the trigger can be a measurement event that is dependent on the UE speed. If the estimated speed exceeds the trigger threshold and/or radio quality metrics also satisfy the trigger, the UE 101 can generate a measurement report to its serving eNB 105. The process of FIG. 6 can then be executed, which may result in a HO to upper/lower cell or transitioning to an idle state.

TABLE 1

| UE speed metric | Radio Metric |
|---|---|
| <3 km/hour | PSSI threshold: 5 dB, sliding window 500 ms |
| 3 km/hour < Speed < 30 km/hour | PSSI threshold: 3 dB, sliding window 200 ms |

As a result of the semi-static algorithm, the following observations are noted. If the UE 101 has a longer DRX period, UE's HO performance may become worse. In other words, the UE 101 may handover later than if it had a shorter DRX period. As a result, the UE 101 will experience poorer channel quality/throughput in the cell edge and a greater number of RLFs. By using the approaches of FIGS. 5-6, the UE's channel quality in the cell edge can be improved, and the number of RLFs can be reduced. Additionally, the network planning overhead in deciding maximum DRX interval in LTE_ACTIVE is reduced, thereby addressing the potential performance problem due to improper planning of the value of the maximum DRX interval.

The semi-static DRX adjustment algorithm can be implemented according to various embodiments: on the network side, or the user equipment side. With respect to implementation on the network side, the network collects both radio channel information and UE speed information. This information can then be stored in a central repository (e.g., centralized management server). When the network detects the current DRX parameter settings degrades system performance by the predetermined metrics, the network triggers the change of DRX parameter via RRC signalling, for example, and instructs the UE to alter its DRX parameter.

Figure 7:
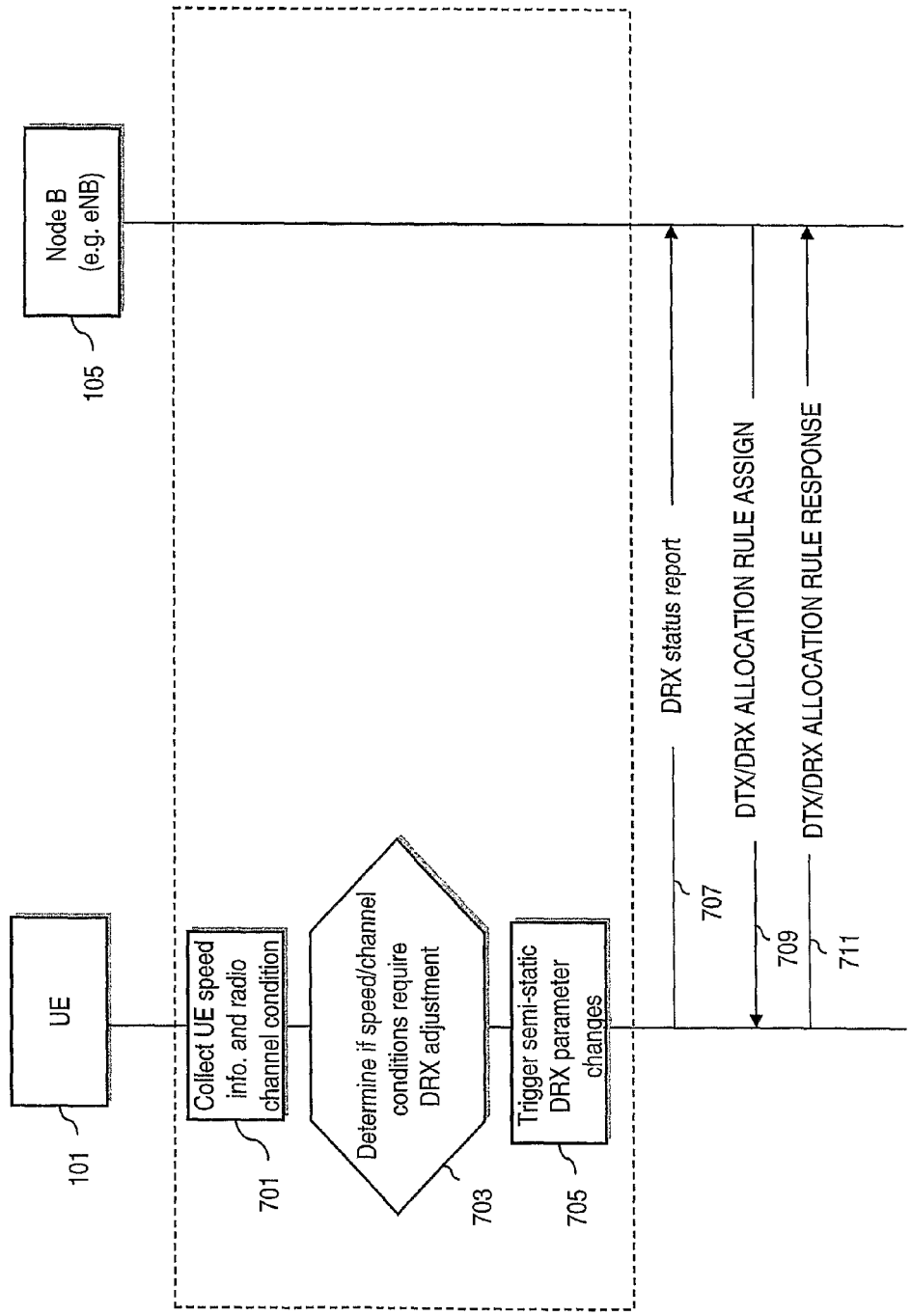
FIG. 7 is a diagram of a network planning process performed on the user equipment side, in accordance with an exemplary embodiment of the invention.

Another approach involves performing the semi-static DRX adjustment algorithm in the UE side, as shown in FIG. 7.

FIG. 7 is a diagram of a network planning process performed on the user equipment side, in accordance with an exemplary embodiment of the invention. Under this scenario, the UE 101 collects radio channel information and UE speed information autonomously, as in step 701. When UE 101 detects that the current DRX parameter degrades system performance based on the measured metrics (step 703), the UE 101 initiates or triggers semi-static DRX parameter changes via RRC signalling (step 705).

As mentioned previously, if the UE 101 is assigned a relatively long DRX period in the RRC_CONNECTED state while moving with high speed in a relative small cell, the UE 101 may not be able to track the changes in the radio channel—which may consequently lead to RLF. To address this problem, the findings of the static algorithm can be employed. This information, which is supplied by the network side, can be used in two ways: (1) the network (e.g., Node B 105) could define a new event trigger (e.g., if the measured parameter goes below a certain threshold for a certain DRX interval); and (2) the UE 101 may internally shorten its measurement interval. In an exemplary embodiment, the UE 101 can autonomously (or internally) shorten the measurement interval to that of the DRX based on certain circumstances—e.g., signal level of the serving cell falls below a predetermined threshold.

Information that is supplied by the network side may include, for example, an instruction to the UE 101 based on a certain threshold for a given DRX interval (e.g., 500 ms) (this process is shown in step 509 as DTX/DRX ALLOCATION RULE ASSIGN in FIG. 5). If, for example, the minimum threshold is exceeded as a result of a measurement for a given DRX interval, the UE 101 may be instructed to implement one of the following:

In case 1, the UE 101 may start the time to trigger timer, and when or if this timer times out, the UE 101 may send a measurement (i.e., status) report to the network, as in step 707. In turn, the Node B 105 transmits an allocation rule assignment message (e.g., DTX/DRX allocation rule assign) to the UE 101, which responds with an allocation rule response message (e.g., DTX/DRX allocation rule response), per steps 709 and 711.

In case 2, the UE 101 may internally, and based on predefined rules, shorten the measurement interval. It is noted that although the interval may be changed in this manner, this need not affect the DRX that is currently active; hence, the change can be performed autonomously by the UE 101 without impacting the network settings. A measurement report that is sent to the network side such as the eNB may result in a handover or state transition. Case 2 with the autonomous DRX time change is illustrated in FIG. 8.

Figure 8:
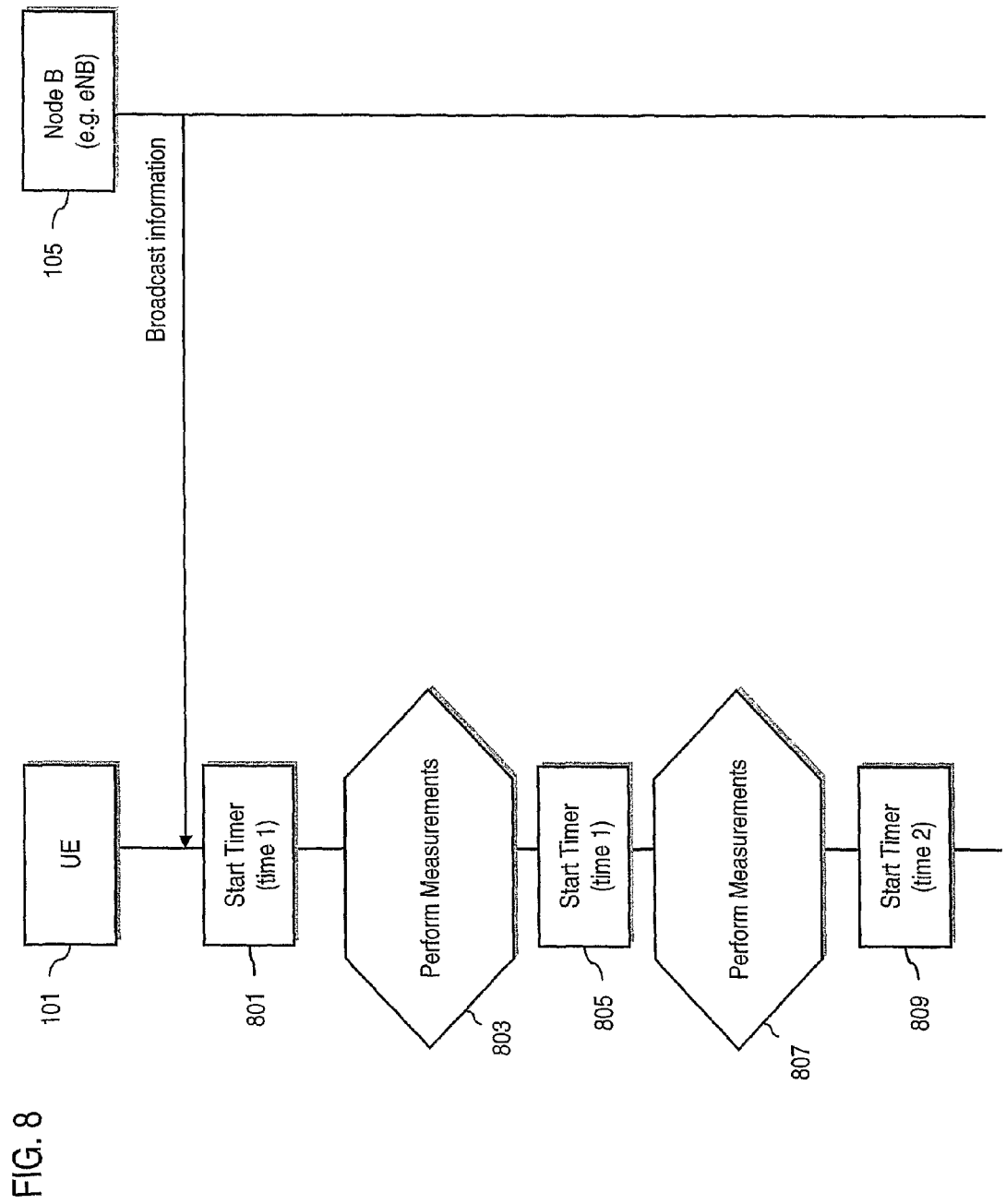
FIG. 8 is a diagram showing a process for modifying a discontinuous communication interval based on measurement threshold level information, in accordance with an exemplary embodiment of the invention.

FIG. 8 is a diagram showing a process for modifying a discontinuous communication interval based on measurement threshold level information, in accordance with an exemplary embodiment of the invention. In this example, the Node B 105 sends broadcast information that may include instructions to the UE 101 based on a certain threshold for a given DRX interval. The UE 101, prior to receiving this information, may be operating its timer for setting the DRX interval (step 801). Once the UE 101 receives the threshold information, the UE 101 may perform measurements and measurement evaluation, as in step 803. Based on the measurements, the UE 101 may restart the DRX timer (805) and again perform measurements (step 807). The UE 101 may then note that the threshold has been exceeded and may fulfil a network defined change of DRX. At this point, the process repeats, with another timer starting, as in step 809.

As evident from the above process, based on the signal level, the UE 101 may shorten the measurement interval (i.e., perform measurements more often than given by the DRX interval), thereby improving the information. This change can be effected internally in the UE 101 with or without need for the measurement report. Such change can be implemented based on network settings (e.g., broadcast or signaled) or according to specified instructions. Further, these additional measurements can be executed independently of DRX (i.e., no need for signaling new DRX parameter).

Figure 9:
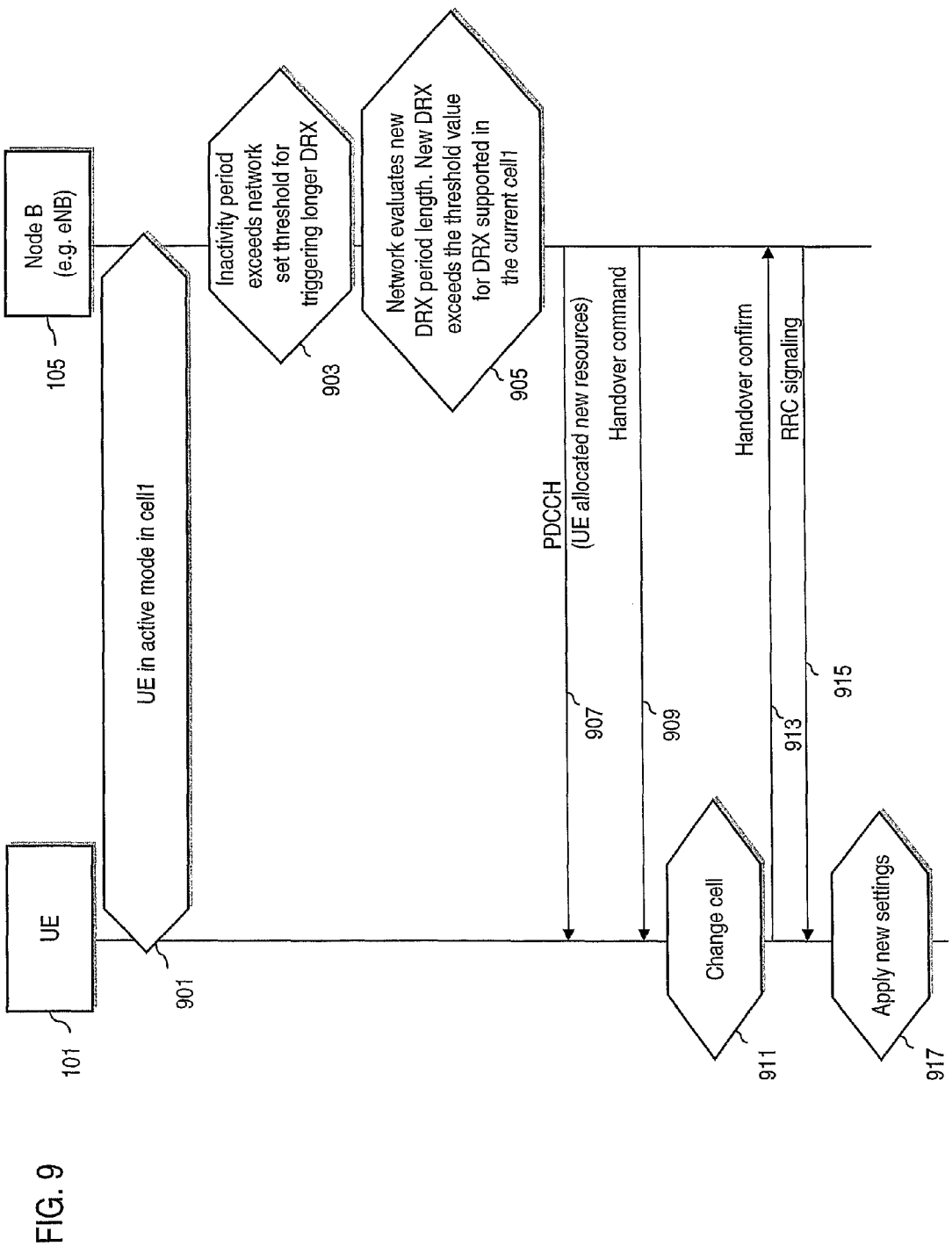
FIG. 9 is a diagram of a network planning process performed on the network side to provide vertical handover, in accordance with an exemplary embodiment of the invention.

FIG. 9 is a diagram of a network planning process performed on the network side to provide vertical handover, in accordance with an exemplary embodiment of the invention. As earlier described, the amount of cell changes can be used as a trigger for mobility. Alternatively, the findings from the static algorithm mentioned above can be used to trigger handovers. This can be performed such that if the algorithm above and network settings are so that for a particular cell size (e.g., a size of 100 m), only certain DRX intervals (e.g., up to 100 ms) can be supported. In case a DRX is to be configured to be longer than the maximum value of 100 ms, the eNB 105 can trigger HO to a cell supporting this longer DRX interval. With this approach, no UE speed is needed; and all control can be executed by the eNB 105 (i.e., network). This can be viewed as a special case of when the UE speed (e.g., pedestrian 3 km/hour) is implicitly used. The various steps relating to such processes are shown in FIG. 9.

Initially, the UE 101 is in active mode in a given cell (e.g., cell1), as in step 901. If the inactivity period exceeds a network set threshold for triggering a longer DRX as determined in step 903, the Node B 105 evaluates the new DRX period length. When the new DRX exceeds the threshold value for DRX supported in the current cell1 (step 905), the UE 101 is allocated new resources, as in step 907, over the Physical Downlink Control Channel (PDCCH) link. In addition, a handover command is issued to the UE 101 from the network side by the Node B 105, per step 909.

In step 911, the UE 101 then changes its cell in response to the handover command. The UE 101 next transmits a handover confirmation signal, as in step 913, to the Node B 105. Thereafter, the Node B 105 utilizes RRC signaling to convey new DRX parameters (step 915). In step 917, the UE 101 applies the new settings.

One of ordinary skill in the art would recognize that the processes for providing network planning may be implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof. Such exemplary hardware for performing the described functions is detailed below with respect to FIG. 10.

Figure 10:
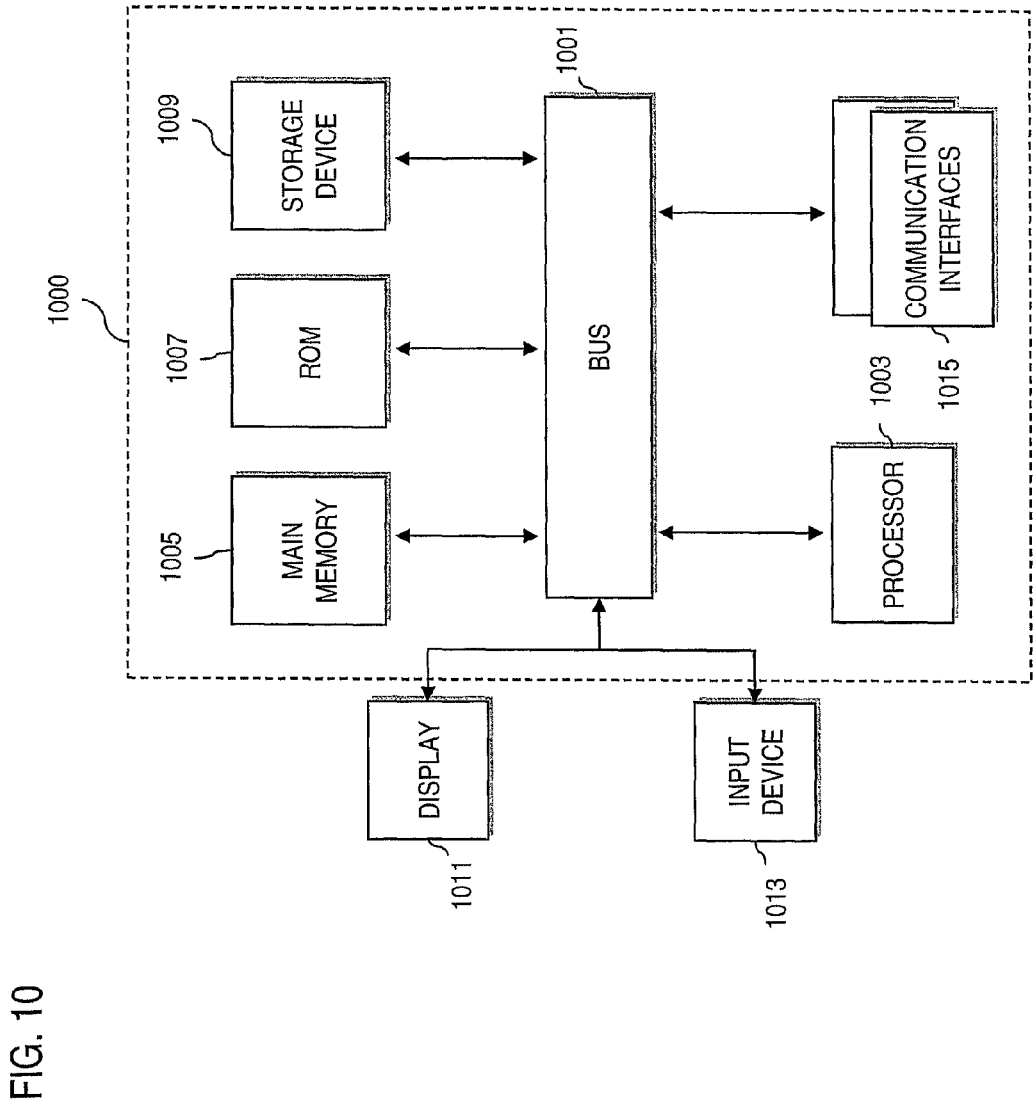
FIG. 10 is a diagram of hardware that can be used to implement an embodiment of the invention.

FIG. 10 illustrates exemplary hardware upon which various embodiments of the invention can be implemented. A computing system 1000 includes a bus 1001 or other communication mechanism for communicating information and a processor 1003 coupled to the bus 1001 for processing information. The computing system 1000 also includes main memory 1005, such as a random access memory (RAM) or other dynamic storage device, coupled to the bus 1001 for storing information and instructions to be executed by the processor 1003. Main memory 1005 can also be used for storing temporary variables or other intermediate information during execution of instructions by the processor 1003. The computing system 1000 may further include a read only memory (ROM) 1007 or other static storage device coupled to the bus 1001 for storing static information and instructions for the processor 1003. A storage device 1009, such as a magnetic disk or optical disk, is coupled to the bus 1001 for persistently storing information and instructions.

The computing system 1000 may be coupled via the bus 1001 to a display 1011, such as a liquid crystal display, or active matrix display, for displaying information to a user. An input device 1013, such as a keyboard including alphanumeric and other keys, may be coupled to the bus 1001 for communicating information and command selections to the processor 1003. The input device 1013 can include a cursor control, such as a mouse, a trackball, or cursor direction keys, for communicating direction information and command selections to the processor 1003 and for controlling cursor movement on the display 1011.

According to various embodiments of the invention, the processes described herein can be provided by the computing system 1000 in response to the processor 1003 executing an arrangement of instructions contained in main memory 1005. Such instructions can be read into main memory 1005 from another computer-readable medium, such as the storage device 1009. Execution of the arrangement of instructions contained in main memory 1005 causes the processor 1003 to perform the process steps described herein. One or more processors in a multi-processing arrangement may also be employed to execute the instructions contained in main memory 1005. In alternative embodiments, hard-wired circuitry may be used in place of or in combination with software instructions to implement the embodiment of the invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the invention are not limited to any specific combination of hardware circuitry and software.

The computing system 1000 also includes at least one communication interface 1015 coupled to bus 1001. The communication interface 1015 provides a two-way data communication coupling to a network link (not shown). The communication interface 1015 sends and receives electrical, electromagnetic, or optical signals that carry digital data streams representing various types of information. Further, the communication interface 1015 can include peripheral interface devices, such as a Universal Serial Bus (USB) interface, a PCMCIA (Personal Computer Memory Card International Association) interface, etc.

The processor 1003 may execute the transmitted code while being received and/or store the code in the storage device 1009, or other non-volatile storage for later execution. In this manner, the computing system 1000 may obtain application code in the form of a carrier wave.

The term "computer-readable medium" as used herein refers to any medium that participates in providing instructions to the processor 1003 for execution. Such a medium may take many forms, including but not limited to non-volatile media, volatile media, and transmission media. Non-volatile media include, for example, optical or magnetic disks, such as the storage device 1009. Volatile media include dynamic memory, such as main memory 1005. Transmission media include coaxial cables, copper wire and fiber optics, including the wires that comprise the bus 1001. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the invention may initially be borne on a magnetic disk of a remote computer. In such a scenario, the remote computer loads the instructions into main memory and sends the instructions over a telephone line using a modem. A modem of a local system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 11:
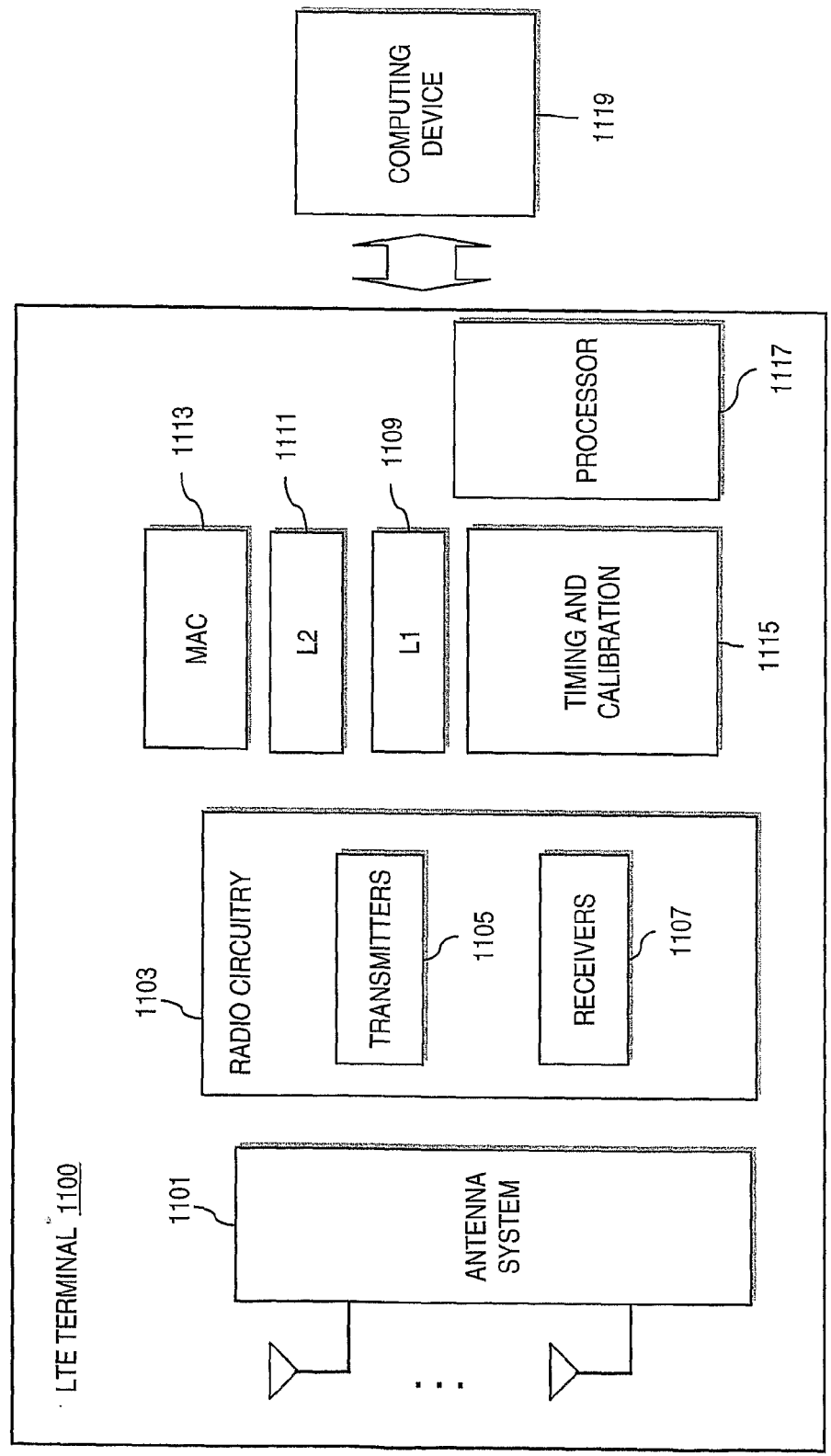
FIG. 11 is a diagram of exemplary components of an LTE terminal capable of operating in the systems of FIGS. 3A-3D, according to an embodiment of the invention.

FIG. 11 is a diagram of exemplary components of an LTE terminal capable of operating in the systems of FIGS. 3A-3D, according to an embodiment of the invention. An LTE terminal 1100 is configured to operate in a Multiple Input Multiple Output (MIMO) system. Consequently, an antenna system 1101 provides for multiple antennas to receive and transmit signals. The antenna system 1101 is coupled to radio circuitry 1103, which includes multiple transmitters 1105 and receivers 1107. The radio circuitry encompasses all of the Radio Frequency (RF) circuitry as well as base-band processing circuitry. As shown, layer-1 (L1) and layer-2 (L2) processing are provided by units 1109 and 1111, respectively. Optionally, layer-3 functions can be provided (not shown). Module 1113 executes all MAC layer functions. A timing and calibration module 1115 maintains proper timing by interfacing, for example, an external timing reference (not shown). Additionally, a processor 1117 is included. Under this scenario, the LTE terminal 1100 communicates with a computing device 1119, which can be a personal computer, work station, a PDA, web appliance, cellular phone, etc.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    assigning a discontinuous reception interval to a user equipment that is served by a cell associated with a wireless network; and
    modifying the discontinuous reception interval based at least in part on speed of the user equipment and size of the cell.

2. The method according to claim 1, further comprising:
    determining ratio of the speed to the cell size; and
    comparing the determined ratio with a threshold to determine whether the discontinuous reception interval is to be modified.

3. A non-transitory computer-readable medium encoded with instructions that, when executed by a computer, perform:
    assigning a discontinuous reception interval to a user equipment that is served by a cell associated with a wireless network; and
    modifying the discontinuous reception interval based at least in part on speed of the user equipment and size of the cell.

4. An apparatus comprising:
    at least one processor;
    and at least one memory including computer program code;
    the at least one memory and the computer program code configured to, with the at least one processor, cause the apparatus at least to:
    assign a discontinuous reception interval to a user equipment that is served by a cell associated with a wireless network, and to modify the discontinuous reception interval based at least in part on speed of the user equipment and size of the cell.

5. The apparatus according to claim 4, wherein the discontinuous reception interval is a maximum value defined to minimize radio link failure experienced by the user equipment.

6. The apparatus according to claim 4, wherein the processor is further configured to determine a ratio of the speed to the cell size, and to compare the determined ratio with a threshold to determine whether the discontinuous reception interval is to be modified.

7. The apparatus according to claim 4, wherein the cell is part of a plurality of cells having a hierarchical structure, and the processor is further configured to generate a signal to instruct the user equipment to handover to a higher level cell if the ratio satisfies the threshold.

8. The apparatus according to claim 4, wherein the processor is further configured to generate a signal for transmission to the user equipment about the discontinuous reception interval, and transmission state of the user equipment, wherein the user equipment is configured to modify, in response thereto, a current discontinuous reception interval and a current transmission state.

9. The apparatus according to claim 4, wherein the processor is further configured to receive a measurement report from the user equipment, and the speed is determined from the measurement report.

10. The apparatus according to claim 9, wherein the measurement report further includes a metric about channel quality experienced by the user equipment, the processor being further configured to modify the discontinuous reception interval based on the metric.

11. The apparatus according to claim 4, wherein the speed is determined based on number of handovers experienced by the user equipment, or is conveyed by the user equipment using a Global Positioning System (GPS) receiver.

12. The apparatus according to claim 4, wherein the network is compliant with a long term evolution (LTE)-compliant architecture.

13. A method comprising:
    collecting radio channel information and speed information associated with a cell of a wireless network; and
    initiating a discontinuous communication procedure to modify a discontinuous reception interval based on a combination of the radio channel information and a ratio of the speed information and size of the cell.

14. The method according to claim 13, further comprising:
    comparing the ratio with a threshold to determine whether the discontinuous reception interval is to be modified.

15. A non-transitory computer-readable medium encoded with instructions that, when executed by a computer, perform:
    collecting radio channel information and speed information associated with a cell of a wireless network; and
    initiating a discontinuous communication procedure to modify a discontinuous reception interval based on a combination of the radio channel information and a ratio of the speed information and size of the cell.

16. An apparatus comprising:
    at least one processor;
    and at least one memory including computer program code;
    the at least one memory and the computer program code configured to, with the at least one processor, cause the apparatus at least to:
    collect radio channel information and speed information associated with a cell of a wireless network, and to initiate a discontinuous communication procedure to modify a discontinuous reception interval based on a combination of the radio channel information and a ratio of the speed information and size of the cell.

17. The apparatus according to claim 16, wherein the processor is further configured to compare the ratio with a threshold to determine whether the discontinuous reception interval is to be modified.

18. The apparatus according to claim 16, wherein the cell is part of a plurality of cells having a hierarchical structure, and a higher level cell is utilized if the ratio satisfies the threshold.

19. The apparatus according to claim 16, wherein the processor is further configured to generate a signal for transmission to a base station, the signal specifying the discontinuous reception interval.

20. The apparatus according to claim 16, wherein the processor is further configured to generate a measurement report that includes the speed information, wherein the speed is determined based on number of handovers, or by using Global Positioning System (GPS) information, the apparatus further comprising:

a transceiver configured to transmit the measurement report to a base station.

* * * * *